(12) United States Patent
Santhoff

(10) Patent No.: US 6,782,048 B2
(45) Date of Patent: Aug. 24, 2004

(54) ULTRA-WIDEBAND COMMUNICATION THROUGH A WIRED NETWORK

(75) Inventor: John Santhoff, San Diego, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 13 days.

(21) Appl. No.: 10/177,292

(22) Filed: Jun. 21, 2002

(65) Prior Publication Data

US 2003/0235235 A1 Dec. 25, 2003

(51) Int. Cl.$^7$ ................................................ A64B 1/66
(52) U.S. Cl. ...................................... 375/240; 398/140
(58) Field of Search ................................ 375/130, 219, 375/326, 240; 370/224; 348/614; 341/157; 455/41.2; 600/300; 398/70–74, 118–214

(56) References Cited

U.S. PATENT DOCUMENTS

| | | | |
|---|---|---|---|
| 3,728,632 A | 4/1973 | Ross | |
| 4,641,317 A | 2/1987 | Fullerton | |
| 4,743,906 A | 5/1988 | Fullerton | |
| 4,813,057 A | 3/1989 | Fullerton | |
| 4,815,106 A | 3/1989 | Propp et al. | |
| 4,864,589 A | 9/1989 | Endo | |
| 4,979,186 A | 12/1990 | Fullerton | |
| 5,051,720 A | 9/1991 | Kittirutsunetorn | |
| 5,363,108 A | 11/1994 | Fullerton | |
| 5,491,463 A | 2/1996 | Sargeant | |
| 5,554,968 A | 9/1996 | Lee | |
| 5,677,927 A | * 10/1997 | Fullerton et al. | 375/130 |
| 5,687,169 A | 11/1997 | Fullerton | |
| 5,729,607 A | 3/1998 | DeFries et al. | |
| 5,745,837 A | 4/1998 | Fuhrmann | |
| 5,774,526 A | 6/1998 | Propp et al. | |
| 5,832,035 A | 11/1998 | Fullerton | |
| 5,864,284 A | 1/1999 | Sanderson | |
| 5,937,342 A | 8/1999 | Kline | |
| 5,940,387 A | 8/1999 | Humpleman | |
| 5,960,031 A | 9/1999 | Fullerton et al. | |
| 5,963,581 A | 10/1999 | Fullerton et al. | |
| 5,982,276 A | 11/1999 | Stewart | |
| 5,995,534 A | 11/1999 | Fullerton et al. | |
| 6,031,862 A | 2/2000 | Fullerton et al. | |
| 6,040,759 A | 3/2000 | Sanderson | |
| 6,178,217 B1 | 1/2001 | Defries et al. | |
| 6,281,784 B1 | 8/2001 | Redgate et al. | |
| 6,373,377 B1 | 4/2002 | Sacca et al. | |
| 6,430,208 B1 | 8/2002 | Fullerton et al. | |
| 6,437,832 B1 | * 8/2002 | Grabb et al. | 348/614 |
| 6,497,656 B1 | * 12/2002 | Evans et al. | 600/300 |
| 6,505,032 B1 | * 1/2003 | McCorkle et al. | 455/41.2 |
| 6,549,567 B1 | * 4/2003 | Fullerton | 375/219 |
| 6,611,223 B2 | * 8/2003 | Low et al. | 341/157 |

OTHER PUBLICATIONS

Electronic Industries Association, Cabel Television Channel Identification Plan, EIA Standard, Apr. 22, 1997, 14 pgs.
U.S. patent application Publication, "System and Method of Using Variable Pulses for Symbology," Application No. 09/812,545, Publication No. US 2002/0076193 A1, published Jun. 20, 2002.

* cited by examiner

*Primary Examiner*—Stephen Chin
*Assistant Examiner*—Curtis Odom
(74) *Attorney, Agent, or Firm*—Peter R. Martinez

(57) ABSTRACT

A method to increase the available bandwidth across a wired network is provided. The method includes transmitting an ultra-wideband signal across the wired network. One embodiment of the present invention may transmit a multiplicity of ultra-wideband signals through a community access television network. The present invention may transmit an ultra-wideband signal across an optical network, a cable television network, a community antenna television network, a community access television network, a hybrid fiber-coax network, an Internet service provider network, and a PSTN network.

24 Claims, 3 Drawing Sheets

ULTRA-WIDEBAND COMMUNICATION THROUGH A WIRED NETWORK

FIELD OF THE INVENTION

The present invention generally relates to ultra-wideband communications. More particularly, the invention concerns a method to transmit ultra-wideband signals through a wired network.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as in-home movies-on-demand and video teleconferencing demand high data transmission rates. Another example is interactive video in homes and offices.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. These large data files, as well as the large data files that provide real-time home video are simply too large to be feasibly transmitted without an increase in system bandwidth. The need for more bandwidth is evidenced by user complaints of slow Internet access and dropped data links that are symptomatic of network overload.

Internet service providers, cable television networks and other data providers generally employ conductive wires and cables to transmit and receive data. Conventional approaches to signal (i.e. data) transmission through a transmission medium, such as a wire or cable, is to modulate the signal though the medium at a frequency that lies within the bounds at which the medium can electrically conduct the signal. Because of this conventional approach, the bandwidth of a specific medium is limited to a spectrum within which the medium is able to electrically transmit the signal via modulation, which yields a current flow. As a result, many costly and complicated schemes have been developed to increase the bandwidth in conventional conductive wire and/or cable systems using sophisticated switching schemes or signal timesharing arrangements. Each of these methods is rendered costly and complex in part because the data transmission systems adhere to the conventional acceptance that the bandwidth of a wire or cable is constrained by its conductive properties.

Therefore, there exists a need for a method to increase the bandwidth of conventional wired networks.

SUMMARY OF THE INVENTION

The present invention provides a method to transmit ultra-wideband signals across any wired network, such as an Internet service provider network, a telephony network, a local area network, a personal area network or any other wired network.

In one embodiment of the invention, a method of transmitting an ultra-wideband signal comprises the steps of providing a wired network and transmitting an ultra-wideband signal across the wired network. Another embodiment of the present invention comprises a method of increasing a bandwidth of an Internet service provider network, or any other type of network employing wired media, by combining a multiplicity of ultra-wideband signals representative of data with the network signal. The combined signal comprising the multiplicity of ultra-wideband signals representative of data and the network signal is received and the two signals are then separated into the multiplicity of ultra-wideband signals representative of data and the network signal.

One feature of the present invention is that an ultra-wideband signal can be transmitted simultaneously with an Internet connection signal or voice transmission signal. Because the ultra-wideband signal can be transmitted substantially simultaneously with the other signals, the overall bandwidth or capability of the network to transmit data is vastly increased.

Figure 1:
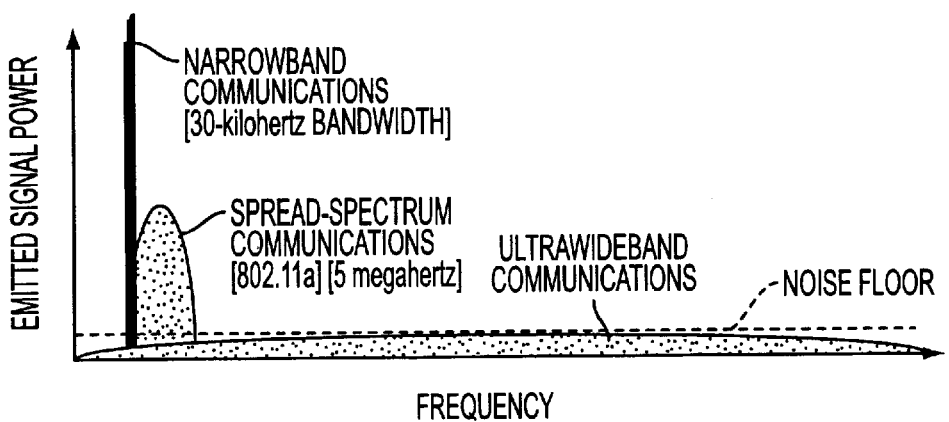
FIG. 1 is an illustration of different communication methods.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Generally, a traditional cable television provider, a community antenna television provider, a community access television provider, a cable television provider, a hybrid fiber-coax television provider, an Internet service provider, or any other provider of television, audio, voice and/or Internet data receives broadcast signals at a central station, either from terrestrial cables, and/or from one or more antennas that receive signals from a communications satellite. The broadcast signals are then distributed, usually by coaxial and/or fiber optic cable, from the central station to nodes located in business or residential areas.

For example, community access television provider (CATV) networks are currently deployed in several different topologies and configurations. The most common configurations found today are analog signals transmitted over coaxial cable and Hybrid Fiber-Coax Systems (HFCS) that employ both fiber optic and coaxial cables. The analog coax systems are typically characterized as pure analog systems. Pure analog CATV systems are characterized by their use of established NTSC/PAL (National Television Standards Committee/Phase Alternation Line) modulation onto a frequency carrier at 6 or 8 MHz intervals.

HFCS is a combination analog—digital topology employing both coaxial (analog) and fiber optic (digital) media that typically supports digitally modulated/encoded television channels above channel 78. According to ANSI/EIA-542-1997, in the United States, the analog channels are modulated in 6 MHz allocations on channels 2 to 78 using frequencies from 55 to 547 MHz. When using HFCS, digital channels typically start at channel 79 and go as high as 136 and occupy a frequency range from 553 to 865 MHz. In some extended HFCS systems, channel assignments can go as high as channel 158 or 997 MHz. The current ANSI/EIA-542-1997 standard only defines and assigns channels to these limits. The actual wire/cable media itself is generally capable of transmitting frequencies up to 3 GHz.

In both CATV and HFCS systems, typically the satellite downlink enters the cable company's head-end and the video, and/or other data streams are de-multiplexed out. Individual video data streams (either NTSC, MPEG, or any other suitable protocol) are extracted from the satellite downlink stream and routed to modulators specific for individual television channels. The outputs from each modulator are then combined into one broadband signal. From this point the combined channels are amplified and sent out, either by coaxial or fiber optic cable, to the customers.

In a HFCS, before the combined broadband signal leaves the head-end the broadband signal is modulated onto a fiber optic cable for distribution into the field, such as residential neighborhoods, or business districts. Modulation of the broadband signal is typically accomplished in one of two ways. In the first method the entire broadband signal is sampled and digitized using a high speed Analog to Digital Converter (ADC). To perform reliable digital sampling, the data must be sampled at a rate at least twice the highest frequency component to meet Nyquist minimum sampling requirements. To provide a higher quality data stream, the signal should be sampled at 2.5 to 4 times the highest frequency, which entails sample rates of approximately 2 to 4 GHz. A parallel to serial converter then shifts the parallel output data of the ADC into a serial format. The serial data then drives a laser diode for transmission over the fiber optic cable. The second method is broadband block conversion where the entire spectrum of the broadband signal is modulated onto the fiber optic cable.

Designated access nodes are located in neighborhoods, business districts and other areas. The access nodes contain a high speed Digital to Analog Converter (DAC) and a de-serializer. A fiber optic receiver detects the laser-modulated signal at the access node. A parallel to serial converter de-serializes the data and it is feed to the high speed DAC. The data then leaves the access node on standard 75 ohm, RG-6 or RG-8 or other suitable coax cable and is distributed to the customer's premises. Thus, at the access node, the broadband signal is extracted from the fiber optic cable and transferred to a coaxial cable that connects to individual homes, apartments, businesses, universities, and other customers. Support of multiple customers is generally accomplished by the use of distribution boxes in the field, for example, on telephone poles or at ground level.

However, as the signal is continuously split at the distribution boxes, the received bandwidth is reduced and the quality of the signal is diminished, thereby diminishing the video, audio, and other data quality.

The digital channels that generally reside on CATV channels 79 and higher are fundamentally different than the analog channels that generally reside on channels 2 through 78. The analog channels are comprised of modulated frequency carriers. The digital channels, which generally use the 6 MHz allocation system, are digitally modulated using Quadrature Amplitude Modulation (QAM). QAM is a method of combining two amplitude modulated signals into a single channel, thereby doubling the effective bandwidth. In a QAM signal, there are two carriers, each having the same frequency but differing in phase by 90 degrees. The two modulated carriers are combined for transmission, and separated after transmission. QAM 16 transmits 16 bits per signal, QAM 32, 64, and 256 each transmit 32, 54 and 256 bits per signal, respectively. QAM was developed to support additional video streams encoded with MPEG video compression. Conventional CATV and HFCS networks may employ QAM levels up to QAM 64 to enable up to 8 independent, substantially simultaneous MPEG video streams to be transmitted.

At the customer's location, the coaxial cable is connected to either a set-top box or directly to a television. The receiving device then de-multiplexes and de-modulates the video, audio, voice, Internet or other data. Although a television can directly receive the analog signal, a set-top box is generally required for reception of the digitally encoded channels residing on CATV channels 79 and higher.

The above-described networks, and other networks and communication systems that employ wired media, such as twisted-pair or coaxial cable, suffer from performance limitations caused by signal interference, ambient noise, and spurious noise. In these conventional wired media systems, these limitations affect the available system bandwidth, distance, and carrying capacity of the system, because the noise floor and signal interference in the wired media rapidly overcome the signal transmitted. Therefore, noise within the wired media significantly limits the available bandwidth of any wired system or network.

Generally, the conventional wisdom for overcoming this limitation is to boost the power (i.e., increase the voltage of the signal) at the transmitter to boost the voltage level of the signal relative to the noise at the receiver. Without boosting the power at the transmitter, the receiver is unable to separate the noise from the desired signal. Thus, the overall performance of wired media systems is still significantly limited by the accompanying noise that is inherent in wired media.

Increasing the available bandwidth of an established wired media network, while coexisting with the conventional data signals transmitted through the network, represents an opportunity to leverage the existing wired media network infrastructure to enable the delivery of greater functionality. Several methods and techniques have been proposed, but they are generally computationally intense, hence costly.

The present invention may be employed in any type of network that uses wired media, in whole, or in part. That is, a network may use both wired media, such as coaxial cable, and wireless devices, such as satellites. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a metropolitan area network (MAN), and a wide area network (WAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others.

The present invention employs a "carrier free" architecture, which does not require the use of high frequency carrier generation hardware, carrier modulation hardware, stabilizers, frequency and phase discrimination hardware or other devices employed in conventional frequency domain communication systems. The present invention dramatically increases the bandwidth of conventional networks that employ wired media, but can be inexpensively deployed without extensive modification to the existing wired media network.

The present invention provides increased bandwidth by injecting, or otherwise super-imposing an ultra-wideband (UWB) signal into the existing data signal and subsequently recovers the UWB signal at an end node, set-top box, subscriber gateway, or other suitable location. Ultra-wideband, or impulse radio, employs pulses of electromagnetic energy that are emitted at nanosecond or picosecond intervals (generally tens of picoseconds to a few nanoseconds in duration). For this reason, ultra-wideband is often called "impulse radio." Because the excitation pulse is not a modulated waveform, UWB has also been termed "carrier-free" in that no apparent carrier frequency is evident in the radio frequency (RF) spectrum. That is, the UWB pulses are transmitted without modulation onto a sine wave carrier frequency, in contrast with conventional radio frequency technology. Ultra-wideband requires neither an assigned frequency nor a power amplifier.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Another example of a conventional radio frequency technology is illustrated in FIG. 1. 802.11a, a wireless local area network (LAN) protocol, transmits radio frequency signals at a 5 GHz center frequency, with a radio frequency spread of about 5 MHz.

Figure 2:
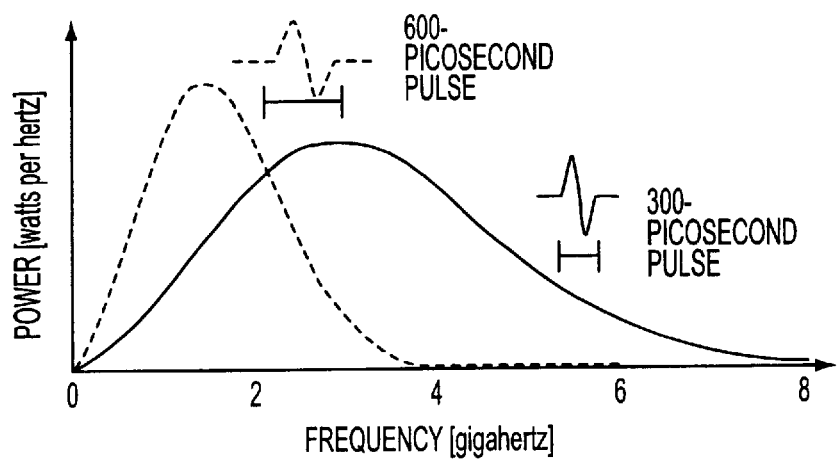
FIG. 2 is an illustration of two ultra-wideband pulses.

In contrast, a UWB pulse may have a 1.8 GHz center frequency, with a frequency spread of approximately 4 GHz, as shown in FIG. 2, which illustrates two typical UWB pulses. FIG. 2 illustrates that the narrower the UWB pulse in time, the higher its center frequency and the broader the spread of its frequency spectrum. This is because frequency is inversely proportional to the time duration of the pulse. A 600 picosecond UWB pulse will have about a 1.8 GHz center frequency, with a frequency spread of approximately 4 GHz. And a 300 picosecond UWB pulse will have about a 3 GHz center frequency, with a frequency spread of approximately 8 GHz. Thus, UWB pulses generally do not operate within a specific frequency, as shown in FIG. 1. And because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt signal of one nano-second duration spreads the one-watt over the entire frequency occupied by the pulse. At any single frequency, such as at the carrier frequency of a CATV provider, the UWB pulse power present is one nano-watt (for a frequency band of 1 GHz). This is well within the noise floor of any wired media system and therefore does not interfere with the demodulation and recovery of the original CATV signals. Generally, the multiplicity of UWB pulses are transmitted at relatively low power (when sampled at a single, or specific frequency), for example, at less than −30 power decibels to −60 power decibels, which minimizes interference with conventional radio frequencies. However, UWB pulses transmitted through most wired media will not interfere with wireless radio frequency transmissions. Therefore, the power (sampled at a single frequency) of UWB pulses transmitted though wired media may range from about +30 dB to about −90 dB.

For example, a CATV system generally employs a coaxial cable that transmits analog data on a frequency carrier. Generally, amplitude modulation (AM) or QAM (discussed above) are used to transmit the analog data. Since data transmission employs either AM or QAM, UWB signals can coexist in this environment without interference. In AM, the data signal M(t) is multiplied with a cosine at the carrier frequency. The resultant signal y(t) can be represented by:

$$y(t)=m(t)\mathrm{Cos}(\omega_c t)$$

In a QAM based system multiple carrier signals are transmitted at the same carrier frequency, but at different phases. This allows multiple data signals to be simultaneously carried. In the case of two carriers, an "in phase" and "quadrature" carriers can carry data signals Mc(t) and Ms(t). The resultant signal y(t) can be represented as:

$$y(t)=Mc(t)\mathrm{Cos}(\omega_c t)+Ms(t)\mathrm{Sin}(\omega_c t)$$

However, as discussed above, an UWB system transmits a narrow time domain pulse, and the signal power is generally evenly spread over the entire bandwidth occupied by the signal. At any instantaneous frequency, such as at the AM or QAM carrier frequency, the UWB pulse power present is one nano-watt (for a frequency band of 1 GHz). This is well within the noise floor of any wired media system and therefore does not interfere with the demodulation and recovery of the original AM or QAM data signals.

Wired media communication systems suffer from performance limitations caused by signal interference, ambient noise, and spurious noise. These limitations affect the available bandwidth, distance, and carrying capacity of the wire media system. With wired communication systems, the noise floor and signal interference in the wired media rapidly overcome the transmitted carrier signal. This noise on the wired media is a significant limitation to the ability of the system to increase bandwidth. UWB technology makes use of the noise floor to transmit data, without interfering with the carrier signal. Moreover, UWB transmitted through a wired medium has distinct advantages over its use in a wireless environment. In a wired environment there are no concerns with intersymbol interference, and there are no concerns relating to multi-user interference.

For example, CATV channels typically occupy 6 MHz in the US and 8 MHz in Europe. These channels are arranged in a re-occurring pattern beginning at approximately 50 MHz and dependent on the CATV system, extend upward to 550 MHz, 750 MHz, 870 MHz, 1 GHz and higher. The present invention is capable of injecting UWB pulses into the existing CATV infrastructure. These UWB signals do not interfere or degrade existing frequency domain signals. Additionally, the UWB signals can carry vast amounts of information with digital meaning in the time domain.

Figure 3:
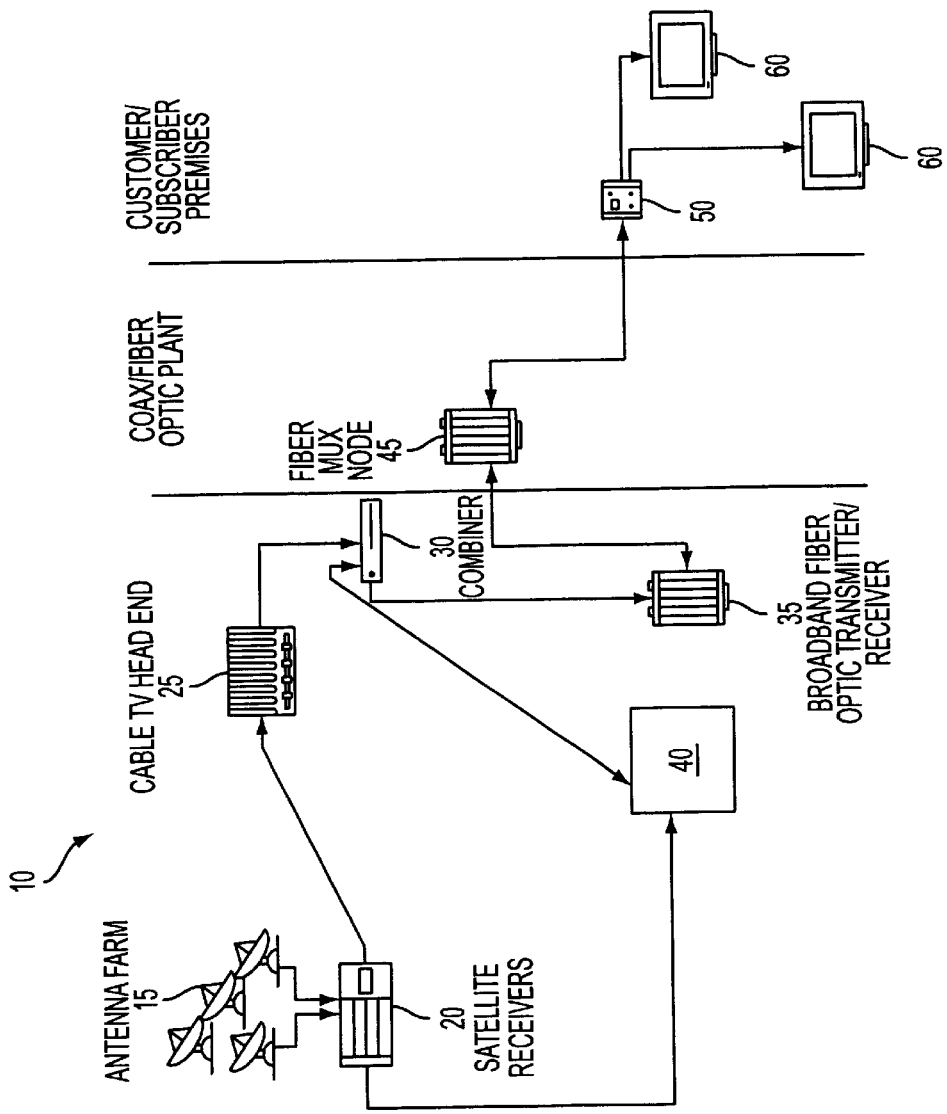
FIG. 3 is a schematic illustration of one embodiment of an ultra-wideband communication system employing a wired medium.
Figure 4:
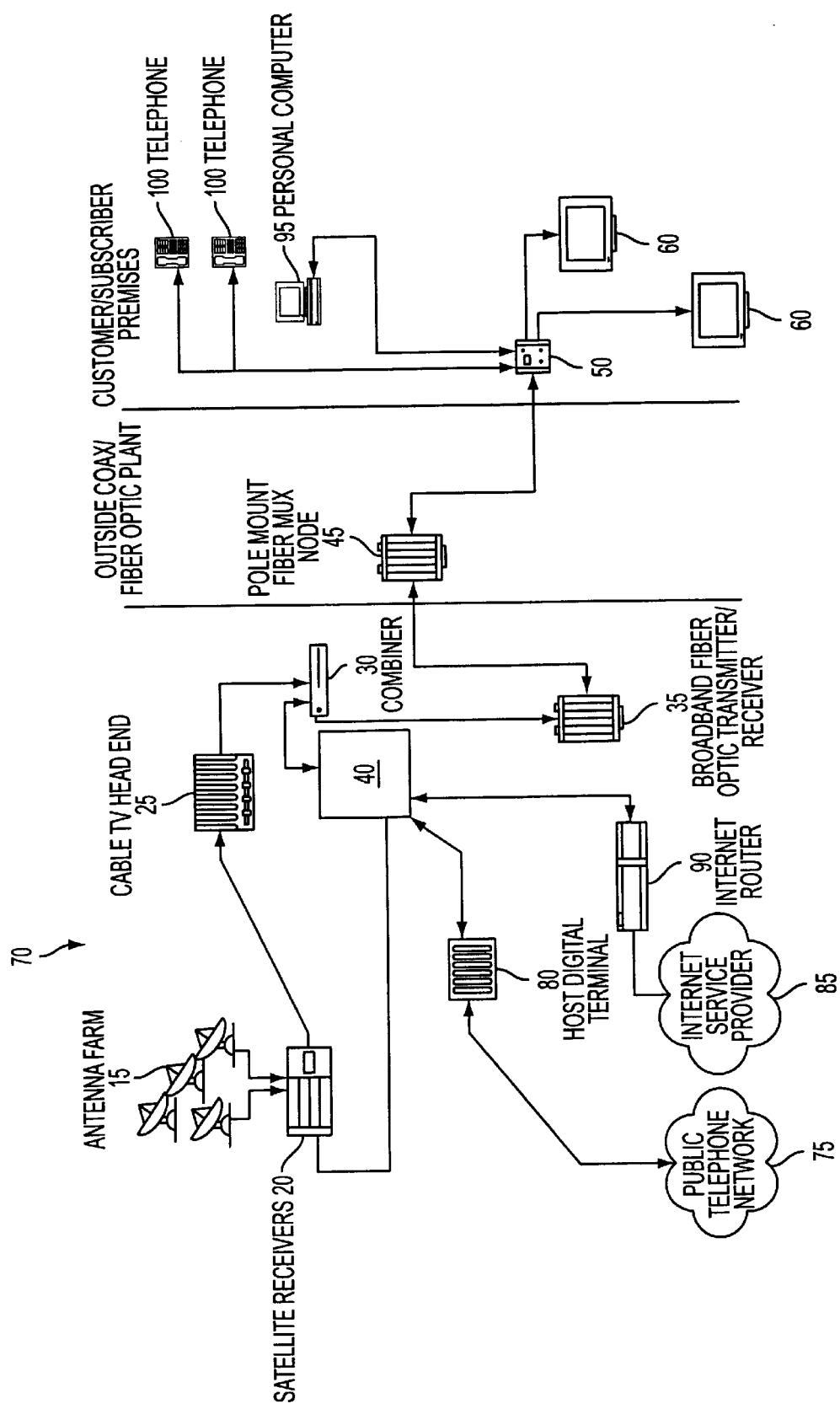
FIG. 4 is a schematic illustration of a second embodiment of an ultra-wideband communication system employing a wired medium.

The present invention provides an apparatus and method to enable any wired media network to augment their available bandwidth. Preferably, this additional bandwidth is obtained by introducing UWB signals into the existing data transmission chain prior to broadcast from the system operator's head-end. As shown in FIGS. 3 and 4, the head-end may include several components, such as the antenna farm 15, the satellite receivers 20, the channel modulator 25, the combiner 30, and the fiber optic transmitter/receiver 35. Alternatively, UWB signals may be introduced into the wired media network at other locations, such as at the Internet router 90 or at the host digital terminal 80, or at any other suitable location.

In like fashion, cable system operators can receive more data from individual subscribers by introducing subscriber-generated data into existing upstream channels. The present invention provides UWB communication across fiber optic and coaxial cable, twisted pair wires, or any other type of conductive wire. A wired media network will be able to both transmit and receive digital information for the purposes of telephony, high-speed data, video distribution, video conferencing, wireless base operations and other similar purposes.

Referring to FIG. 3, the wired ultra-wideband communication system 10 is configured to transmit ultra-wideband signals over an existing network or system that includes wired media. For example, the wired ultra-wideband (UWB) system 10 may transmit UWB signals over an existing community access television network (CATV), an optical network, a cable television network, a community antenna television network, a hybrid fiber-coax television network, an Internet service provider network, a PSTN network, a WAN, LAN, MAN, TCP/IP network, a college campus, town, city, or any other type of network as defined above, that employs wired media, in whole or in part.

One embodiment of the wired UWB communication system 10 is illustrated in FIG. 3. An antenna farm 15 receives audio, video and data information from one or more satellites (not shown). Additional data may be received by terrestrial cables and wires and by terrestrial wireless sources, such as a multichannel multipoint distribution service (MMDS). The data is then forwarded to the satellite receivers 20 that demodulate the data into separate audio, video and data streams. This information is forwarded to the channel modulators 25 that receive the program signals, such as CNN or MTV. The channel modulators 25 mix each signal with a radio frequency (RF) and assign a station number (such as 2 to 99) that each program will be received on by subscribers.

The multiple RF signals are then forwarded to a combiner 30 that combines the multiple signals into a single output. That is, the combiner 30 receives the program signals from the channel modulators 25 and combines them onto a single coax cable and forwards the signal to the fiber optic transmitter/receiver 35. The above-described arrangement and function of channel modulators 25 and combiners 30 may vary with each type of wired media network.

Additional audio, video, or other data signals received from either the antenna farm 15 or from terrestrial sources such as fiber optic or coaxial cables can be routed from the satellite receiver 20 to the service provider ultra-wideband (UWB) device 40. The service provider UWB device 40 converts the audio, video, or other data signals received from the satellite receiver 20 into a multiplicity of UWB electromagnetic pulses. The service provider ultra-wideband (UWB) device 40 may include several components, including a controller, digital signal processor, an analog coder/decoder, one or more devices for data access management, and associated cabling and electronics. The service provider ultra-wideband (UWB) device 40 may include some, or all of these components, other necessary components, or their equivalents. The controller may include error control, and data compression functions. The analog coder/decoder may include an analog to digital conversion function and vice versa. The data access management device or devices may include various interface functions for interfacing to wired media such as phone lines and coaxial cables.

The digital signal processor in the service provider ultra-wideband (UWB) device 40 modulates the audio, video, or other data signals received from the satellite receiver 20 into a multiplicity of UWB electromagnetic pulses, and may also demodulate UWB pulses received from the subscriber. As defined herein, modulation is the specific technique used to encode the audio, video, or other data into a multiplicity of UWB pulses. For example, the digital signal processor may modulate the received audio, video, or other data signals into a multiplicity of UWB pulses that may have a duration that may range between about 0.1 nanoseconds to about 100 nanoseconds, and may be transmitted at relatively low power, for example, at less than –30 power decibels to –60 power decibels, as measured across the transmitted frequency.

The UWB pulse duration and transmitted power may vary, depending on several factors. Different modulation techniques employ different UWB pulse timing, durations and power levels. The present invention envisions several different techniques and methods to transmit an UWB signal across a wired medium. One embodiment, may for example, use pulse position modulation that varies the timing of the transmission of the UWB pulses. One example of a pulse position modulation system may transmit approximately 10,000 pulses per second. This system may transmit groups of pulses 100 picoseconds early or 100 picoseconds late to signify a specific digital bit, such as a "0" or a "1". In this fashion a large amount of data may be transmitted across a wired medium. Alternatively, the UWB signal may be transmitted in a fashion similar to that described in U.S. Patent Application entitled, "ENCODING AND DECODING ULTRA-WIDEBAND INFORMATION," Ser. No. 09/802,590 (in the name of John H. Santhoff and Rodolfo T. Arrieta), which is referred to and incorporated herein in its entirety by this reference.

An alternative modulation technique may use pulse amplitude modulation to transmit the UWB signal across a wired medium. Pulse amplitude modulation employs pulses of different amplitude to transmit data. Pulses of different amplitude may be assigned different digital representations of "0" or "1." Other envisioned modulation techniques include On-Off Keying that encodes data bits as pulse (1) or no pulse (0), and Binary Phase-Shift Keying (BPSK), or bi-phase modulation. BPSK modulates the phase of the signal (0 degrees or 180 degrees), instead of modulating the position. Spectral Keying, which is neither a PPM nor PAM modulation technique may also be employed. It will be appreciated that other modulation techniques, currently existing or yet to be conceived, may also be employed.

A preferred modulation technique will optimize signal coexistence and pulse reliability by controlling transmission power, pulse envelope shape and Pulse Recurrent Frequencies (PRF). Both pseudo-random and fixed PRFs may be used, with the knowledge that a fixed PRF may create a "carrier-like frequency," which it and its higher order harmonics may interfere with the data carried in conventional RF carrier channels. However, with a pseudo-random PRF the difficulties encountered with a fixed PRF are usually avoided. One embodiment of a pseudo-random PRF modulation technique may include a UWB pulse envelope that is shaped to pre-amplify and compensate for high frequency components that the wired media may naturally attenuate. UWB pulse envelope shaping has the additional advantage of controlling the power spectral density of the transmitted data stream.

Several advantages exist when transmitting UWB pulses through wired media as opposed to transmitting UWB pulses through a wireless medium. Wireless UWB transmissions must consider such issues as Inter-Symbol Interference (ISI) and Multi-User Interference (MUI), both of which can severely limit the bandwidth of UWB transmissions. Some modulation techniques such as Pulse Amplitude Modulation (PAM), which offer the ability for high bit densities are not effective at long wireless distances. These, and other issues, do not apply to UWB pulses transmitted over wired media. In addition, no multipath issues arise and there are no propagation delay problems present in a wired medium. Therefore, it is estimated that an ultra-wideband system may be able to transmit data across a wired medium in a range from 100 Mbit/second to 1 Gbit/second. This data rate will ensure that the bandwidth requirements of any service provider can be met.

A preferred embodiment of the service-provider UWB device 40 will spread the signal energy of the UWB data stream across the a bandwidth that may ranger from 50 MHz to approximately 870 MHz or as discussed above, to 1 GHz, or higher. This will ensure that the signal energy present at any frequency is significantly below the normal noise floor for that frequency band, further ensuring coexistence with conventional RF carrier data.

For example, a UWB pulse would have a duration of about 1 nano-second in a UWB data stream that has a 1 GHz bandwidth. Alternatively, the UWB pulse duration would be tailored to match the available frequency of the specific network. For a CATV or HFCS network located in the United States, an ideal UWB pulse would generally be about 0.5 to 2 nano-seconds in duration. This is because a conventional CATV or HFCS network located in the United States typically utilizes a maximum frequency of approximately 870 MHz, but has the capacity to utilize up to 1 GHz. This bandwidth allows for a 1 to 2 nano-second pulse duration. A narrow pulse width is preferred because more pulses can be transmitted in a discrete amount of time. Pulse widths of up to 2 nano-seconds may be employed to guarantee pulse integrity throughout digitization, transmission, reception and reformation at the UWB subscriber device 50. Generally, an idealized pulse width would be calculated based on the frequency response of the specific wired media system.

Referring to FIG. 3, the multiplicity of generated UWB pulses are sent from the service-provider UWB device 40 to the combiner 30, which combines the UWB pulses with the conventional RF carrier signals. One method to accomplish this task is to couple a wire carrying the conventional RF carrier signals to a standard coaxial splitter. A second wire carrying the UWB pulses is also coupled to the standard coaxial splitter. The combined signals are forwarded to the fiber optic transmitter/receiver 35. The fiber optic transmitter/receiver 35 converts both the multiplicity of UWB pulses and the conventional RF carrier signals received from the combiner 30 into a corresponding optical signal. The optical signal generator can be either a light-emitting diode, solid state laser diode, or other suitable device. The optical signal is then distributed on fiber optic cables to residential neighborhoods, business districts, universities, colleges or other locations for distribution to subscribers and customers. Other methods and techniques for combining a UWB pulse stream and a conventional RF carrier signal stream may also be employed. For example, the UWB pulse stream my be sent directly to the fiber optic transmitter/receiver 35, which will then combine the two signals.

Shown in FIG. 3, a fiber multiplexer node 45 may be located at any one of the locations described above. The optical signals are received by the multiplexer 45 and are converted back to the combined conventional RF carrier and UWB pulsed signals. The combined signals are forwarded to a subscriber UWB device 50. The subscriber UWB device 50 can be considered a gateway or router that provides access to the combined signals.

One embodiment of the subscriber UWB device 50 will demodulate the multiplicity of UWB electromagnetic pulses back into a conventional RF carrier signal. The subscriber UWB device 50 may include all, some or additional components found in the service provider UWB device 40. In this manner, additional bandwidth will be available to the wired media network to provide the additional data and functionality demanded by the customer.

An alternative embodiment of the present invention is illustrated in FIG. 4. A full service wired UWB communication system 70 is structured to allow for extremely high data rate transmission of video, telephone, internet and audio signals.

The full service UWB system 70 receives audio, video and data information from an antenna farm 15 or from terrestrial sources such as fiber optic or coaxial cables. These signals are forwarded to the satellite receivers 20 as described above with reference to the wired UWB communication system 10. In addition, signals from a public telephone network 75 are received by a host digital terminal 80. The host digital terminal 80 modulates multiple voice signals into two-way upstream and downstream RF signals.

The voice signals from the host digital terminal 80 are forwarded to the service provider UWB device 40.

An internet service provider 85 forwards internet data to the internet router 90. The internet router 90 generates packets, such as TCP/IP packets, which are forwarded to the service provider UWB device 40.

The service provider UWB device 40 modulates the internet data, the telephony data and the data received from the satellite receivers 20 into a multiplicity of electromagnetic pulses, as described above, and forwards the pulses to the combiner 30. The combiner combines the UWB pulses with the conventional RF carrier signals and forwards the combined signal to the fiber optic transmitter/receiver 35. The signals are then converted into an optical signal by either a light emitting diode, solid state laser diode, or other suitable device. The optical signal is then distributed to the fiber multiplexer node 45 located within business districts, residential neighborhoods, universities, colleges and other areas.

The fiber multiplexer node 45 receives the fiber optic signal and converts them back to the combined conventional RF carrier and UWB pulsed signals. The combined signals are forwarded to a subscriber UWB device 50. The subscriber UWB device 50 can be considered a gateway or router that provides access to the combined signals. The subscriber UWB device 50 demodulates the multiplicity of UWB electromagnetic pulses into RF signals and forwards the RF signals to appropriate locations such as televisions, personal computers or telephones. Alternative embodiment subscriber UWB devices 50 may be located adjacent to televisions sets similar to a set-top box and used to transmit on-demand movies, internet access or pay-per-view programs. Yet another embodiment of the present invention may include a UWB device 50 that may be located within a television set, or computer. The UWB device 50 is constructed to convert and distribute data to computers, network servers, digital or subscription televisions, interactive media devices such as set-top boxes and telephone switching equipment.

The subscriber UWB device 50 may also be configured to transmit UWB pulses wirelessly to provide audio, video, and other data content to personal computers, televisions, PDAs, telephones and other devices. For example, UWB device 50 may include the necessary components to transmit and receive UWB or conventional RF carrier signals to provide access to interfaces such as PCI, PCMCIA, USB, Ethernet, IEEE1394, or other interface standards.

The present invention will also allow for data to be transmitted "upstream" toward the service provider. For example, a conventional CATV or HFCS network reserves frequencies below 50 MHz for upstream traffic. One embodiment of the present invention may include a band-pass filter with stop-bands above 1 GHz, and below 50 MHz to ensure attenuation of UWB pulses so as not to interfere with upstream traffic. These filters also serve the purpose of limiting potential inter-modulation distortion that could be introduced by the UWB pulses.

Alternative embodiments of the present invention may transmits UWB pulses through traditional telephone wires. Depending upon the provider, whether they be a local or long distance carrier, an UWB transmitter/receiver can be located in a regional center, sectional center, primary center, toll center, end-office, or their equivalents.

The present invention of transmitting ultra-wideband signals across a wired medium can employ any type of wired media. For example, the wired media can include optical fiber ribbon, fiber optic cable, single mode fiber optic cable, multi-mode fiber optic cable, plenum wire, PVC wire, and coaxial cable.

In addition, the wired media can include twisted-pair wiring, whether shielded or unshielded. Twisted-pair wire may consist of "pairs" of color-coded wires. Common sizes of twisted-pair wire are 2 pair, 3 pair, 4 pair, 25 pair, 50 pair and 100 pair. Twisted-pair wire is commonly used for telephone and computer networks. It comes in ratings ranging from category 1 to category 7. Twisted-pair wiring also is available unshielded. That is, the wiring does not have a foil or other type of wrapping around the group of conductors within the jacket. This type of wiring is most commonly used for wiring for voice and data networks. The foregoing list of wired media is meant to be exemplary, and not exclusive.

As described above, the present invention can provide additional bandwidth to enable the transmission of large amounts of data over an existing wired media network, whether the wired media network is a Internet service provider, cable television provider, or a computer network located in a business or university. The additional bandwidth can allow consumers to receive the high speed Internet access, interactive video and other features that they are demanding.

Thus, it is seen that an apparatus and method for transmitting and receiving ultra-wideband signals through a wired medium is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A method of increasing a bandwidth of a community access television network, the method comprising the steps of:

providing a community access television network;

combining a multiplicity of ultra-wideband signals representative of data with a community access television network signal prior to a signal transmission;

receiving a combined signal comprising the multiplicity of ultra-wideband signals representative of data and the community access television network signal; and separating the combined signal into the multiplicity of ultra-wideband signals representative of data and the community access television network signal.

2. The method of claim 1, wherein the ultra-wideband signals representative of data comprise a multiplicity of pulse quadrature amplitude modulated signals.

3. The method of claim 1, wherein the ultra-wideband signals representative of data comprise a multiplicity of pulse position modulated signals.

4. The method of claim 1, wherein the ultra-wideband signals representative of data comprise a multiplicity of pulse amplitude modulated signals.

5. The method of claim 1, wherein the ultra-wideband signals representative of data are modulated at a fixed pulse rate frequency.

6. The method of claim 1, wherein the ultra-wideband signals representative of data are modulated at a variable pulse rate frequency.

7. The method of claim 1, wherein the ultra-wideband signals representative of data are modulated at a pseudo-random pulse rate frequency.

8. The method of claim 1, wherein the community access television network is selected from the group consisting of: an optical network, a cable television network, a community antenna television network, and a hybrid fiber coax television network.

9. The method of claim 1, wherein the multiplicity of ultra-wideband signals comprise an impulse radio signal.

10. The method of claim 1, wherein the multiplicity of ultra-wideband signals comprise a pulse of electromagnetic energy having a duration that can range between about 0.1 nanoseconds to about 100 nanoseconds.

11. The method of claim 1, wherein the multiplicity of ultra-wideband signals comprise a pulse of electromagnetic energy having a duration that can range between about 0.1 nanoseconds to about 100 nanoseconds and a power that can range between about 30 power decibels to about −90 power decibels, as measured at a single frequency.

12. The method of claim 1, wherein the multiplicity of ultra-wideband signals are used to transmit data selected from a group consisting of: telephony data, high-speed data, digital video data, digital television data, Internet communication data and audio data.

13. The method of claim 1, wherein the community access television network signal is used to transmit data selected from the group consisting of: telephony data, high-speed data, digital video data, digital television data, Internet communication data and audio data.

14. A method of transmitting and receiving data through a hybrid fiber-coax television network, the method comprising the steps of:

providing a hybrid fiber-coax television network;

combining a multiplicity of ultra-wideband signals representative of data with a hybrid fiber-coax television network signal prior to a signal transmission;

receiving a combined signal comprising the multiplicity of ultra-wideband signals representative of data and the hybrid fiber-coax television network signal; and separating the combined signal into the multiplicity of ultra-wideband signals representative of data and the hybrid fiber-coax television network signal.

15. The method of claim 14, wherein the multiplicity of ultra-wideband signals comprise an impulse radio signal.

16. The method of claim 14, wherein the multiplicity of ultra-wideband signals comprise a pulse of electromagnetic energy having a duration that can range between about 0.1 nanoseconds to about 100 nanoseconds.

17. The method of claim 14, wherein the multiplicity of ultra-wideband signals comprise a pulse of electromagnetic energy having a duration that can range between about 0.1 nanoseconds to about 100 nanoseconds and a power that can range between about 30 power decibels to about −90 power decibels, as measured at a single frequency.

18. The method of claim 14, wherein the multiplicity of ultra-wideband signals are used to transmit data selected from a group consisting of: telephony data, high-speed data, digital video data, digital television data, Internet communication data and audio data.

19. The method of claim 14, wherein the hybrid fiber-coax television network signal is used to transmit data selected from the group consisting of: telephony data, high-speed data, digital video data, digital television data, Internet communication data and audio data.

20. The method of claim 14, wherein the ultra-wideband signal and the hybrid fiber-coax television network signal use a substantially common portion of an electromagnetic radiation spectrum.

21. The method of claim 14, wherein the ultra-wideband signal and the hybrid fiber-coax television network signal are transmitted in a frequency band that can range from between about 100 KHz to about 3 GHz.

22. The method of claim 14, wherein the ultra-wideband signal and the hybrid fiber-coax television network signal use separate portions of an electromagnetic radiation spectrum.

23. The method of claim 14, wherein the ultra-wideband signal is transmitted in a frequency band that can range from between about 880 MHz to about 3 GHz and the hybrid fiber-coax television network signal is transmitted in a frequency band that can range from between about 100 KHz to about 3 GHz.

24. The method of claim 14, wherein the ultra-wideband signal is transmitted in a frequency band that can range from between about 1 GHz to about 3 GHz and the hybrid fiber-coax television network signal is transmitted in a frequency band that can range from between about 1 MHz to about 900 MHz.

* * * * *